United States Patent [19]
Wilke

[11] 3,771,382
[45] Nov. 13, 1973

[54] BALL-THREADED SPINDLE NUT WITH AT LEAST ONE INDIVIDUAL OVERFLOW INSERT MEMBER

[76] Inventor: Richard Wilke, Am Weissenfeld 4, Schwelm, Germany

[22] Filed: Oct. 3, 1972

[21] Appl. No.: 294,501

[30] Foreign Application Priority Data
Oct. 4, 1971    Germany............... P 21 49 392.5

[52] U.S. Cl. ............................................. 74/459
[51] Int. Cl. ........................................... F16h 55/00
[58] Field of Search ............... 308/6 R; 74/424.8 R, 74/459

[56] References Cited
UNITED STATES PATENTS
| | | | |
|---|---|---|---|
| 2,618,166 | 11/1952 | Douglas | 74/459 |
| 3,372,605 | 3/1968 | Orner | 74/459 |
| 2,924,113 | 2/1960 | Orner | 74/459 |
| 3,161,073 | 12/1964 | Deutsch et al. | 74/459 |
| 3,176,535 | 4/1965 | Rowland | 74/459 |

FOREIGN PATENTS OR APPLICATIONS
920,649    3/1963    Great Britain

Primary Examiner—Charles J. Myhre
Assistant Examiner—Barry Grossman
Attorney—Ernest G. Montague

[57]    ABSTRACT

A spherical-thread spindle nut bearing at least one single-transfer insert piece, which comprises a spherical-thread spindle nut and a spindle. A nut housing surrounds the spindle. Two adjacent thread starts have thread flanks. At least one single-transfer insert piece is disposed between the thread flanks. Balls are adapted to travel in threads along bearing lines in the direction of rotation of a nut and the spindle. The bearing lines, receiving the load in the direction of rotation in the thread of the nut, are interrupted in the range of the transfer of the balls into and out of, respectively, said single-transfer insert piece by each of a bevel and perpendicular, respectively, forming a place of discontinuity. The balls, upon leaving and re-entering, respectively, into the bearing lines, rest at predetermined first points simultaneously on perpendicular guide path wall parts, at predetermined second points each, and seat themselves in the guide path bottom, extending perpendicularly to the guide path wall part, at each of predetermined third points. The perpendicular guide path wall part of the single-transfer insert piece is bent parallel to the bearing lines, the latter being free of points of discontinuity at the sides opposite the points of discontinuity.

4 Claims, 6 Drawing Figures

BALL-THREADED SPINDLE NUT WITH AT LEAST ONE INDIVIDUAL OVERFLOW INSERT MEMBER

The present invention relates to a spherical-thread spindle nut with at least one single-transfer insert piece.

In spherical-thread spindle nuts of the above-indicated type, the spherical guide path in the single-transfer insert piece is formed as a space curve, which is yieldingly adjusted to the diameter of the balls. In these previously known embodiments, the starting end of such a yielding space curve can be compared for purposes of comparison with an over-raised steep-banked curve of a racetrack which a race car must move through.

It is apparent, that these previously known single-transfer insert pieces are different, first of all, for each spindle diameter, second of all, for each spindle pitch, and, third of all, for each ball diameter, and must be recalculated in each case. From this there follows a huge number of space curves, the economical manufacture of which with the required precision causes considerable expense and difficulties. Since the transfers of this previously known type must never change their position in the nut, it is furthermore known, to manufacture these single-transfer insert pieces as noncylindrical insert pieces, which requires further expenses in connection with the manufacture of the holes in the nut, which holes receive the insert pieces.

In recognition of the disadvantages of the previously known single-transfer insert pieces, it is one object of the present invention, to develop the invention with a view to design and manufacture for the travel of the ball that, in addition to better adjustment to the spindle diameter, spindle pitch and to the size of the ball, a continuous, disturbance-free travel of the ball is guaranteed.

It is another object of the invention to interrupt the bearing line in the nut thread receiving the load in the specific direction of rotation in the transfer range of the balls into the single-transfer insert piece or out of same by a separate bevel or perpendicular forming a point of discontinuity, the balls upon leaving their nut-side bearing line or upon re-entrance into the mentioned bearing line supporting themselves simultaneously on a vertical wall part of the guide path and seating themselves in the bottom of the guide path which extends perpendicular to the wall part of the guide path. Furthermore the vertical wall part of the guide path of the single-transfer insert piece is bent at an angle at the sides opposite the points of discontinuity parallel to the bearing lines free of points of discontinuity in the nut thread.

By the reduction to practice of the present invention, there is created, deviating from a previously known yielding space curve, a straight guide path having a rectangular cross-section for the travel of the balls, which path is adjustable to the highest extent to spindle diameter, spindle pitch and the size of the balls and can be manufactured considerably more economically than is the case with the previously known space curve.

The simple rectangular formation of the guide path is based in this connection on the following consideration. The ogive profiles preferably employed for the manufacture of highly accurate spherical-thread spindles produce a well defined bearing line of the balls in the thread profile of spindle and nut. The transmission force therefore occurs along this bearing line via the balls.

Allowing the transfer process of the balls to take place with optimum efficiency is based on the arrangement of a point of discontinuity at which the balls leave their bearing lines without transition, i.e. without yielding curve, and immediately become free of load. At the same moment, the ball which leaves the bearing line and is now relieved of load is supported with a higher lying-point — its back — against a perpendicular wall part of the guide path and at the same time is seated on the guide path bottom of this rectangularly formed guide path and passes via the thread flank between two thread starts into the adjacent thread start, the centrifugal force exerting the driving action.

If one furthermore starts from the basis, that in previously known single-transfer insert pieces a contour other than a cylindrical shape has been proposed, then one particular advantage of the subject matter of the present invention is to be seen in the design which is particularly characteristic of it that the single-transfer insert piece is formed by a cylindrical insert piece inserted in a housing bore and merely secured in position by adherence exactly centrally between two adjacent thread profiles.

Since furthermore, due to the transferring balls now relieved of load in accordance with the embodiment of the ball guide path in the single-transfer insert piece, practically no forces are exerted on it, a bonded connection, for instance by means of synthetic resin adhesives, is sufficient to hold the single-transfer insert piece secured against rotation in the nut housing.

Within the scope of the structural development of the guide path in the single-transfer insert piece, a solution first of all results in the bottom curve of the spherical guide path describing a circular arc, in which connection only the inlet and outlet conditions are fulfilled with respect to the simultaneous application of the balls both against the bearing point in the thread profile and also in the bottom curve.

A parallel solution can, however, also be seen in the bottom curve being formed by a rib, which extends merely over part of the bottom and satisfies the inlet and outlet conditions of the simultaneous application of the balls against the bearing point in the thread profile and in the bottom of the guide path, the rib being received and held by a groove in the bottom of the single-transfer insert piece, which bottom is now flat and extends in tangential direction.

The advantages of this second-described possibility reside not only in advantages from the standpoint of manufacturing technique, but also in the obtaining of an even larger lubrication space. Both solutions are, however, capable of fully satisfying the requirements stipulated of dependable transfer.

Summarizing, it has thus been possible by the invention to create a single-transfer insert piece, which is characterized by structural simplicity and simplicity of manufacture and also by a dependable action within the scope of the ball transfer, so that this solution constitutes a considerable advance in the art and thus is far superior to all previously described embodiments of the same type.

With these and other objects in view, which will become apparent in the following detailed description, the present invention which is shown by example only, will be clearly understood in connection with the accompanying drawings, in which.

Figure 1:
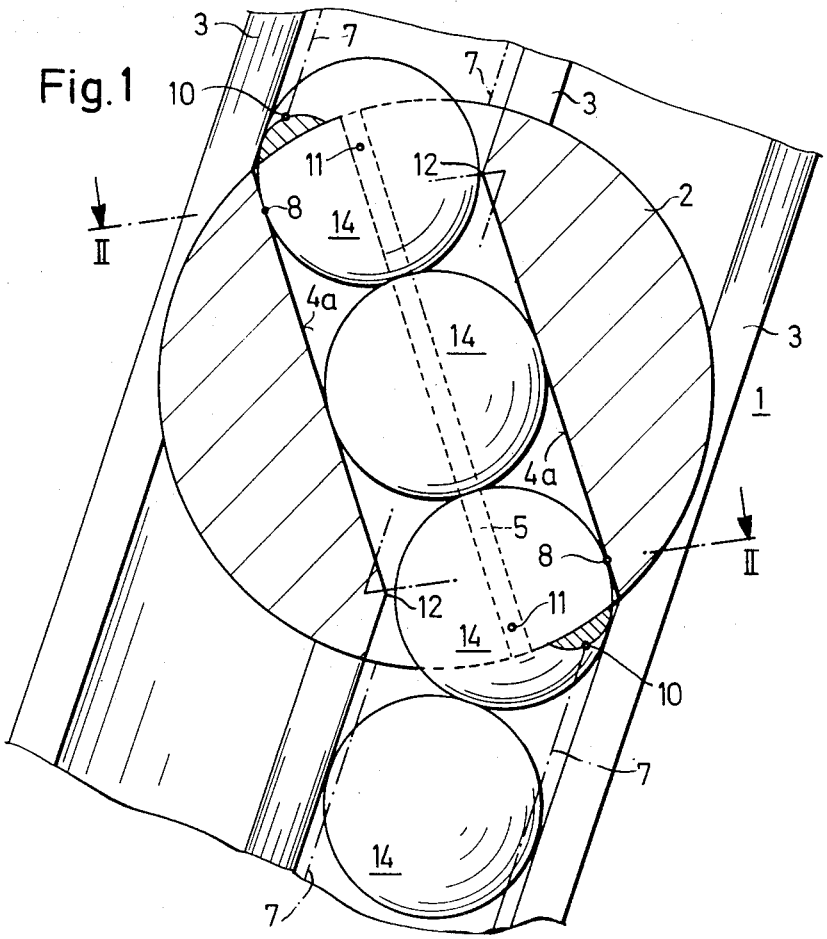
FIG. 1 is a fragmentary top plan view of a spindle nut, seen with two adjacent thread starts and with a cylindrical single-transfer insert piece shown in cross section.
Figure 2:
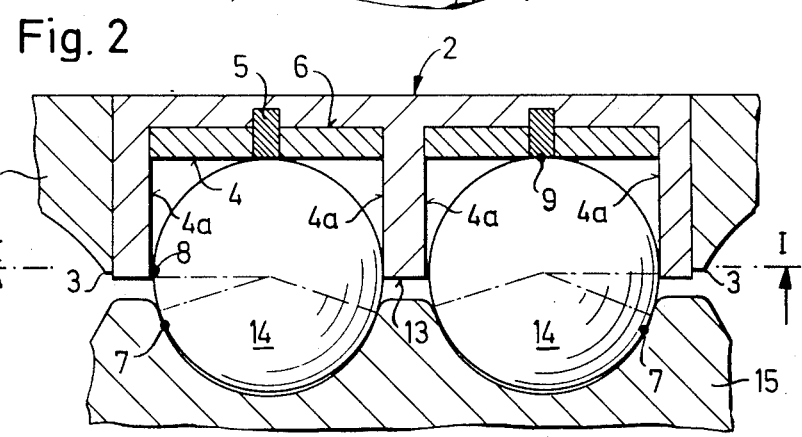
FIG. 2 is a fragmentary longitudinal section through the nut with single-transfer insert piece and spindle.
Figure 4:
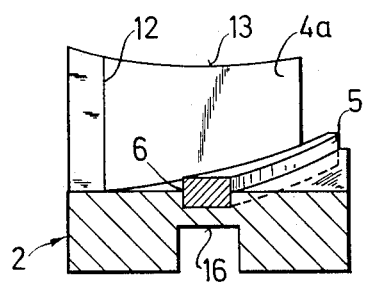
FIG. 4 is a section along the lines A – B of FIG. 3.
Figure 6:
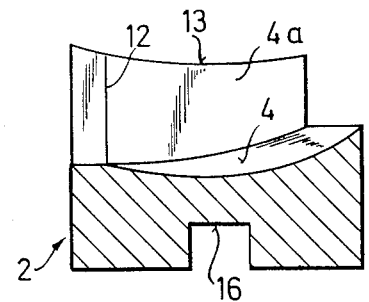
FIG. 6 is an embodiment of a single-transfer insert piece without a guide rib, shown as a section along the lines A – B of FIG. 3, FIGS. 3 – 6 being shown on a smaller scale than FIGS. 1 and 2.
Figure 3:
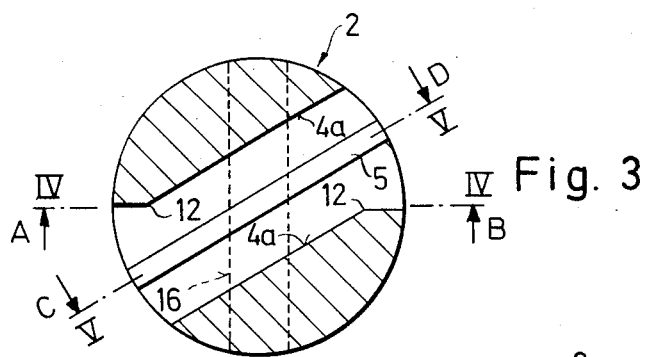
FIG. 3 is a single-transfer insert piece with a guide rib on the bottom side shown in cross-section by itself.
Figure 5:
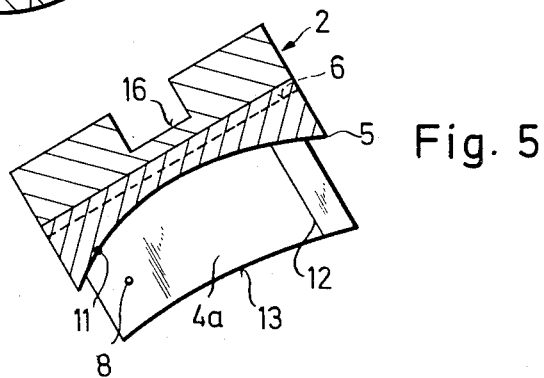
FIG. 5 is another section of the single-transfer insert piece along the lines C – D of FIG. 3.

Referring now to the drawings, the spherical-thread nut comprises a nut housing/surrounding a spindle 15, in which nut housing/ there are provided two adjacent thread starts having thread flanks 3. A cylindrical single-transfer insert piece 2 is arranged between the outer thread flanks 3 of the two adjacent thread starts. Balls 14 travel in the threads along the bearing lines 7 in the two possible directions of rotation of nut and spindle 15.

Upon the entrance of the ball 14 into the guide path 4 and 4a of the single-transfer insert piece, the ball leaves its bearing lines at the point 10. The circular curve indicated at the point 10 in the upper line in the thread profile which is established by an oblique grinding with a grinding disk simultaneously in the inlet and outlet range, suitably after the bore is provided in the nut to receive the single-transfer insert piece 2. The bevel must be at least so steep, that the balls upon leaving the bearing point 10 rest without contact with said oblique plane simultaneously on the point 8 on the perpendicular guide path wall part 4a and rest on the point 11 in the guide path bottom 4, only the force due to gravity of the ball still acting on the guide path 4 and 4a, which force, as known from experience, is not great enough to change the position of the single-transfer insert piece which is bonded in position. Instead of the ground incline, a vertical wall can also be established with a mill cutter along the circular path at point 10. The satisfaction of this condition results in a stumble-free entrance and exit of the balls.

Since the balls 14 carry out a three-dimensional movement upon entrance and exit, the perpendicular guide-path wall part 4a is bent at the point 12 parallel to the bearing lines 7 which are free of places of discontinuity. The forming of this beveling, for instance by hobbing, does not constitute any difficulty.

The rectangular guide path 4 and 4a produces a grease storage space of large volume so that, with a corresponding supply of grease, continuous lubrication of the spherical-thread spindle is possible in practice. Since the bottom curve 4 of the spherical guide path 4 and 4a is dependent of the spindle diameter and the pitch and is difficult to calculate, the embodiment having an insert guide rib 5 with the contact point 9 results in three particular advantages. First of all, in this way the grease space for the continuous lubrication is further increased. Second of all, the space 6, 4a with the receiving nut for the bottom curve rib 5 can now be produced more easily and is now still only dependent on the pitch, but no longer dependent on the spindle diameter. And thirdly, the bottom curve rib 5 the shape of the curve of which is determined by the spindle diameter and the development of the thread flanks 3 can be determined empirically with respect to the shape of its curve and then be produced in large number by punching.

The shape of the curve 5 is furthermore not critical. It is only important that there be precisely satisfied the condition that the ball simultaneously contact the points 10, 11 and 8. When the ball has left the point 10, then it depends solely on the speed of rotation, i.e. the speed of the ball, whether it follows, as a result of centrifugal force of the bottom curve 5, which may be a circular arc, which has such a large radius that the ball has no contact with the thread flank 3. If the speed of the ball is too small, then it will, guided by the perpendicular guide-path wall parts 4a, climb over the thread flank 3 without contacting the bottom curve 5.

The curve designated 13 has a circular shape with sufficient spacing from the spindle-flank diameter. The slot 16 serves for adjustment of the transfer.

Although in the specification there has been taken as basis the preferred ogival profile with well defined bearing lines 7, the transfer can in this same development advantageously also be used in the case of circular-arc profiles, and even acme thread profiles, since the position of the point 10, as shown by experience, is retained even in the case of these profiles with sufficient accuracy during the course of the life of the spindle nut.

While I have disclosed several embodiments of the present invention, it is to be understood that these embodiments are given by example only.

I claim:

1. A spherical-thread spindle nut bearing at least one single-transfer insert piece, comprising
   a spherical-thread spindle nut,
   a spindle,
   a nut housing surrounding said spindle,
   two adjacent thread starts having thread flanks,
   at least one single-transfer insert piece disposed between said thread flanks,
   balls adapted to travel in threads along bearing lines in the direction of rotation of a nut and said spindle,
   said bearing lines, receiving the load in the direction of rotation in the thread of said nut, being interrupted in the range of the transfer of said balls into and out of, respectively, said single-transfer insert piece by each of a bevel and perpendicular respectively, forming a place of discontinuity,
   said balls, upon leaving and reentering, respectively, into said bearing lines, rest at predetermined first points simultaneously on perpendicular guide path wall parts, at predetermined second points each, and seat themselves in the guide path bottom, extending perpendicularly to said guide path wall part, at each of predetermined third points, and
   said perpendicular guide path wall part of said single-transfer insert piece being bent parallel to said bearing lines, the latter being free of points of discontinuity at the sides opposite said points of discontinuity.

2. The spherical-thread spindle nut, as set forth in claim 1, wherein
   said single-transfer insert piece comprises a cylindrical insert piece inserted in a bore of said housing and secured in position merely by bonding precisely in the center between two adjacent thread profiles.

3. The spherical-thread spindle nut, as set forth in claim 1, wherein
the bottom curve of said ball guide path defines a circular arc, so that the inlet and outlet conditions are fulfilled with respect to the simultaneous engagement of said balls on the bearing point in the thread profile and in said bottom curve.

4. The spherical-thread spindle nut, as set forth in claim 1, wherein
the bottom curve comprises a rib extending merely over a part of the width of the bottom, to fulfill the inlet and outlet conditions of the simultaneous engagement of said balls at said bearing point in said thread profile and in the bottom of said guide path,
the bottom of said single-transfer insert piece having a groove and being now flat and extending in tangential direction and
said rib being received and held in said groove.

* * * * *